(12) United States Patent
Frey et al.

(10) Patent No.: US 11,654,728 B2
(45) Date of Patent: May 23, 2023

(54) STEERING PIVOT PIN FORMING AN INTERNAL PNEUMATIC PASSAGE

(71) Applicant: POCLAIN HYDRAULICS INDUSTRIE, Verberie (FR)

(72) Inventors: Adam Frey, Racine, WI (US); Homer Hawk, Franklin, WI (US); Sylvain Michon, Oak Creek, WI (US)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 663 days.

(21) Appl. No.: 16/627,234

(22) PCT Filed: Jun. 28, 2018

(86) PCT No.: PCT/FR2018/051588
§ 371 (c)(1),
(2) Date: Dec. 27, 2019

(87) PCT Pub. No.: WO2019/002774
PCT Pub. Date: Jan. 3, 2019

(65) Prior Publication Data
US 2020/0122526 A1 Apr. 23, 2020

(30) Foreign Application Priority Data

Jun. 30, 2017 (FR) ...................................... 1756152

(51) Int. Cl.
*B60C 23/00* (2006.01)
*F04D 25/08* (2006.01)
*F04D 25/06* (2006.01)

(52) U.S. Cl.
CPC .. *B60C 23/00381* (2020.05); *B60C 23/00354* (2020.05); *B60C 23/00363* (2020.05); *F04D 25/06* (2013.01); *F04D 25/08* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| 2010/0067839 A1* | 3/2010 | Fischer | F16C 19/184 |
| | | | 384/544 |
| 2016/0265518 A1* | 9/2016 | Vianney | F04B 1/047 |

(Continued)

FOREIGN PATENT DOCUMENTS

| FR | 338562 | 5/1904 | |
| FR | 2465602 A1 | 3/1981 | |
| FR | 3037533 A1 | 12/2016 | |
| GB | 2477816 A | 8/2011 | |
| WO | WO-2019002781 A1 * | 1/2019 | ....... B60C 23/00336 |

*Primary Examiner* — Andre J Allen
(74) *Attorney, Agent, or Firm* — The Webb Law Firm (57) ABSTRACT

The invention relates to an assembly including a hydraulic apparatus having a rotor and a stator. The rotor is mounted so as to turn about a second rotation axis with respect to the stator and is secured to a device suitable for mounting a vehicle wheel. A pivot-pin element is intended to be mounted on an axle and is mounted so as to rotate about a first rotation axis with respect to the hydraulic apparatus. The stator is mounted so as to turn about the first rotation axis with respect to the axle. An air chamber is formed between the pivot-pin element and the hydraulic apparatus, the air chamber is connected to a distribution passage formed in the hydraulic apparatus. An axle passage is formed in the pivot-pin element so as to form a pneumatic passage between the pivot-pin element and the hydraulic apparatus.

10 Claims, 4 Drawing Sheets

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .............................................. 73/146–146.8
See application file for complete search history.

(56) References Cited

U.S. PATENT DOCUMENTS

| | | |
|---|---|---|
| 2016/0368329 A1 | 12/2016 | Vidal et al. |
| 2018/0037071 A1* | 2/2018 | Musgrave ......... B60C 23/00318 |
| 2018/0312019 A1* | 11/2018 | Linzbach ......... B60C 23/00354 |
| 2020/0062047 A1* | 2/2020 | Bonora ............ B60C 23/00318 |

* cited by examiner

STEERING PIVOT PIN FORMING AN INTERNAL PNEUMATIC PASSAGE

CROSS-REFERENCE TO RELATED APPLICATIONS

This application is the United States national phase of International Application No. PCT/FR2018/051588 filed Jun. 28, 2018, and claims priority to French Patent Application No 1756152 filed Jun. 30, 2017, the disclosures of which are hereby incorporated by reference in their entirety.

FIELD OF THE INVENTION

The present disclosure relates to the hydraulic machines, and more specifically to the combination of a pneumatic supply system on a vehicle wheel driven by a hydraulic apparatus.

STATE OF THE PRIOR ART

It is known to propose a pneumatic supply system on a vehicle wheel in order to control the inflation state and to allow the inflation/deflation of the tires, and thus for example to vary the contact surface with the ground, which proves to be particularly interesting for some applications.

Within the context of steered wheels of the vehicle, a recurring problem is the production of the pneumatic supply between the stationary axle and the running wheel. The supply systems using flexible ducts prove indeed to be problematic in some applications and can lead to risks of breakage. Generally, the air must be conveyed from a compressor which is stationary relative to the frame/axle to a steered wheel. The steered wheel having a movement pivoting relative to the frame, a hose directly linking the compressor to the wheel undergoes repeated displacements and the risk of wear and detachment is high.

The present disclosure thus aims at answering at least partially this problem.

SUMMARY OF THE INVENTION

For this purpose, the present disclosure proposes an assembly comprising a hydraulic apparatus comprising a rotor and a stator, the rotor being rotatably mounted relative to the stator along a second axis of rotation, and being secured to means adapted for the mounting of a vehicle wheel, a pivot element intended to be mounted on an axle, and movable in rotation relative to the hydraulic apparatus along a first axis of rotation, the stator being rotatably mounted relative to the axle along the first axis of rotation, characterized in that an air chamber is formed between the pivot element and the hydraulic apparatus, said air chamber being connected to a distribution conduit arranged in the hydraulic apparatus, and to an axle conduit arranged in the pivot element, so as to form a pneumatic conduit between the pivot element and the hydraulic apparatus, in order to allow air to be conveyed for the inflation/deflation of a tire.

Said assembly typically comprises at least one friction pad positioned in contact with the hydraulic apparatus and with the pivot element, configured to allow a rotational movement about the first axis of rotation between the pivot element and the hydraulic apparatus.

Said at least one friction pad is then typically positioned in a grease chamber isolated from the air chamber by means of a grease seal, said grease chamber being connected to a grease conduit arranged in the pivot element or in the hydraulic apparatus.

The grease chamber is thus typically separated from the air chamber by at least one sealing element.

The grease chamber is then typically separated from the air chamber by two successively mounted sealing elements, defining therebetween an intermediate chamber, connected to the surrounding environment by a conduit comprising a rated check valve.

The rated check valve is then typically configured to open for a pressure difference of less than 1 bar, preferably less than 0.5 bar.

According to one example, said assembly further comprises an intermediate rotation part positioned in a housing formed between the hydraulic apparatus and the pivot element.

According to a particular embodiment of such an example, a first air chamber is formed between the pivot element and intermediate rotation part, a second air chamber is formed between the intermediate rotation part and the hydraulic apparatus, the first air chamber is connected to the axle conduit, the second air chamber is connected to the distribution conduit, and the first air chamber is connected to the second air chamber via an intermediate conduit formed in the intermediate rotation part.

According to one example, each air chamber is delimited by sealing elements.

In one example, the pivot element and/or the hydraulic apparatus comprise at least one conduit connecting volumes adjacent to the air chambers to the surrounding environment, each of said at least one conduit being equipped with a rated check valve, configured to allow the fluid to escape toward the surrounding environment when the pressure within said volumes adjacent to the air chambers exceeds a threshold value.

The present disclosure also relates to a vehicle equipped with such a system.

BRIEF DESCRIPTION OF THE DRAWINGS

The invention and its advantages will be better understood upon reading the detailed description given below of various embodiments of the invention given as non-limiting examples. This description refers to the pages of appended figures, in which.

In all the figures, the elements in common are identified by identical reference numerals.

DETAILED DESCRIPTION OF EXEMPLARY EMBODIMENTS

A first embodiment of the invention is described below with reference to FIGS. 1 and 2.

These figures represent a system comprising a hydraulic apparatus 3 coupled to an axle 1 by means of a pivot 2. The hydraulic apparatus 3 is movably mounted relative to the axle 1 along a first axis of rotation XX by means of the pivot 2.

The hydraulic apparatus 3 is, for example, a hydraulic radial-piston and multilobe cam apparatus. Alternatively, the hydraulic apparatus may be an axial-piston apparatus, a pallet apparatus, an internal or external gear apparatus.

It thus comprises a distributor 31 formed of a core 31a surrounded by a distribution casing 31b, a cylinder block 32 comprising a plurality of cylinders extending radially relative to a second axis of rotation Z-Z and in which pistons 33 slide, and a multilobe cam 34 disposed opposite the pistons 33. The hydraulic apparatus 3 also comprises a shaft 4 and a casing 35, sections of which may be formed in particular by the cam 34 and by the distribution casing 31b.

For the hydraulic apparatus 3, an assembly of stationary elements or stator, and an assembly of rotating elements or rotor are defined. In the example illustrated, the rotor comprises the shaft 4 and the cylinder block 32, while the stator comprises the cam 34, the casing 35 and the distributor 31. However, it is understood that the rotor and the stator are defined according to the desired application, but that a hydraulic apparatus 3 can thus for example be used in a rotating casing and stationary shaft mounting, or in a stationary casing and rotating shaft mounting, which corresponds to the application represented in FIG. 1. The connection between the rotor and the stator is carried out via a bearing 5 here comprising two rolling elements 5A and 5B, typically conical rolling elements, here disposed according to an O-mounting. For example, the rolling element 5A is a grease-lubricated rolling element and the rolling element 5B is an oil-lubricated rolling element, in particular oil from the hydraulic apparatus. A seal is disposed between the two rolling elements to prevent contamination of the grease with oil. As an alternative, the two rolling elements 5A and 5B are disposed according to an X-mounting.

The hydraulic apparatus 3 typically comprises means configured to allow carrying a vehicle wheel rim and tire. In the example represented, the shaft of the hydraulic apparatus 3 forms a wheel spindle, having a free end equipped with a radially extending portion and forming a support area for fixing a rim (not represented). In the example illustrated, the shaft 4 thus forms a wheel spindle comprising a hub 42 at a free end for fixing a rim.

In the example represented, the pivot 2 connects the distribution casing 31b (also called distribution casing) to the axle 1 via two pivot links 2A and 2B aligned along the axis X-X on either side of the hydraulic apparatus 3. For manufacturing reasons, the pivot link is made between the distribution casing 31b and a pivot element 11 secured to the axle 1, this pivot element can thus be made with manufacturing tolerances thinner than the axle 1.

Figure 1:
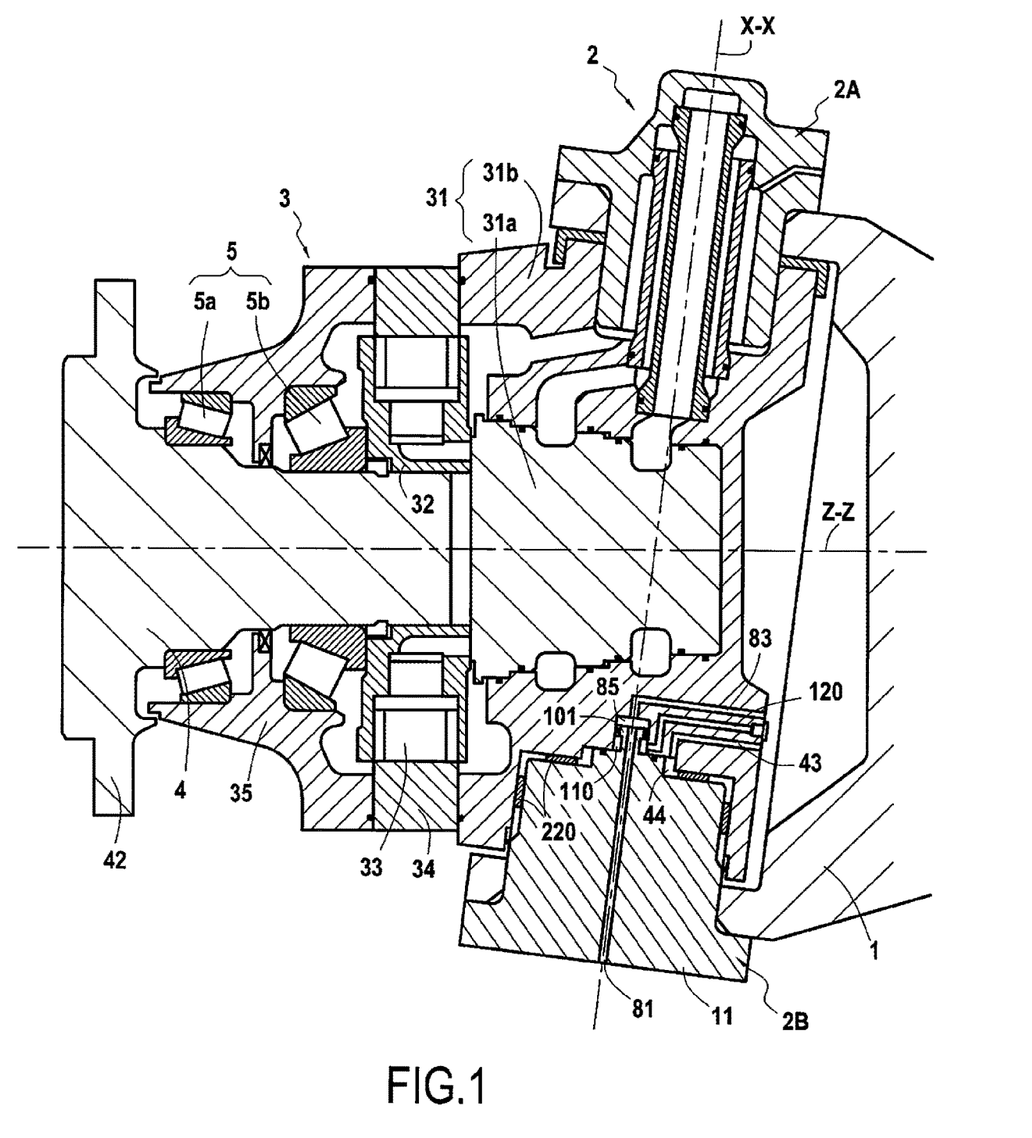
FIG. 1 represents a system according to one aspect of the invention.

One of the pivot links, in this case the upper pivot link 2A in the embodiment represented in FIG. 1, typically comprises conduits forming hydraulic supply lines for the hydraulic apparatus 3 directly made in the pivot and connected to the distributor 31 of the hydraulic apparatus 3.

The other of the pivot links 2B, here the lower pivot link, comprises means for the formation of pneumatic conduit within the pivot, as described below.

Alternatively, the upper pivot link 2A comprises means for the formation of pneumatic conduit and the lower pivot link 2B comprises conduits forming hydraulic supply lines for the hydraulic apparatus 3.

The considered pivot link allows a relative rotation of the hydraulic apparatus 3 and of the axle 1 along the first axis of rotation X-X. FIGS. 2 and 3 represent two embodiments of such a pivot link.

One or more friction pads 220 are interposed between the axle 1 (or, where appropriate, the pivot element 11) and the distribution casing 31b, these friction pads 220 being adapted to ensure contact while allowing a relative rotation between the axle 1 (or, where appropriate, the pivot element 11) and the distribution casing 31b and having good resistance to wear. In the example represented, two friction pads 220 are represented; the one ensuring an axial contact relative to the axis of rotation X-X between the axle 1 and the distribution casing 31b, and the other ensuring a radial contact relative to the axis of rotation X-X between the axle 1 and the distribution casing 31b. These friction pads 220 thus ensure the formation of the pivot link between the axle 1 (via the pivot element 11) and the distribution casing 31b.

A grease chamber 44 is formed at the interface between the pivot element 11 and the distribution casing 31b, in order to lubricate the friction pads 220. Sealing elements are positioned to isolate the grease chamber 44. A grease conduit 43 is here formed in the distribution casing 31b to provide a feed of grease into the grease chamber 44. The grease conduit 43 could alternatively be made in the pivot element 11, the function being then unchanged.

The proposed system aims at achieving an air circulation, that is to say a pneumatic duct within the pivot, to allow a pressurized air supply between the axle 1 and the hydraulic apparatus 3, these two elements being movable in rotation relative to each other about the axis of rotation XX.

Conduits and air chambers are thus arranged in the axle 1, in the pivot element 11 and in the distribution casing 31b as described below.

An axle conduit 81 is made in the pivot element 11 (or directly in the axle 1 in the case of an embodiment not comprising the pivot element 11), and connects the external environment to an air chamber 85 formed between the pivot element 11 and the distribution casing 31b.

In the represented embodiment, the axle conduit 81 is central in the pivot and oriented toward the axis of rotation X-X. Alternatively, the axle conduit 81 may not be centered on the axis X-X and/or have a portion inclined relative to the axis X-X. It can also open at a circumferential end of the pivot element 11.

A distribution conduit 83 formed in the distribution casing 31b then extends from this air chamber 85 and is configured to be connected to a pneumatic duct secured to the hydraulic apparatus 3.

The distribution conduit 83 may be opening at its other end (and is then adapted to be associated with hydraulic connector elements), or be connected to a conduit or to an air chamber arranged in the hydraulic apparatus 3. The distribution conduit 83 can thus be connected to an air chamber directly via the casting of the casing of the hydraulic apparatus 3, in order to supply a tire associated with the hydraulic apparatus 3 with pressurized air.

It is therefore understood here that the axle conduit 81 and the distribution conduit 83 are formed in elements movable in rotation relative to each other. It is the air chamber 85 that carries out the fluid connection between these two conduits 81 and 85, thus achieving an air circulation within the pivot, without requiring the use of conduits or flexible elements connecting two movable portions relative to each other.

The air chamber 85 is isolated from the grease chamber 44 by two successively mounted sealing elements, typically an air seal 101 and a grease seal 102. These sealing elements aim at preventing the grease of the grease chamber 44 from entering the air chamber 85, and at preventing the air of the air chamber 85 from reaching the grease chamber 44.

An intermediate area 110 is then formed between the two sealing elements 101 and 102. In the represented embodiment, this intermediate area 110 is connected to the surrounding environment via a leakage conduit 120 equipped with an rated check valve 122, configured to allow the fluid present in the intermediate area 110 to escape when the pressure exceeds therein a predetermined threshold value. The rated check valve 122 is configured to open at a pressure difference of less than 1 bar, preferably less than 0.5 bar. The intermediate area therefore acts as a buffer area, and allows collecting and discharging any leakage from the grease chamber 44 or from the air chamber 85.

In the represented example, the leakage conduit 120 is arranged in the distribution casing 31b. It is understood that this leakage conduit can also be arranged in the pivot element 11, as it connects the intermediate area 110 to the external environment.

Alternatively, a single seal ensures the sealing between the grease chamber 44 and the air chamber 85. There is then no intermediate area formed.

Figure 2:
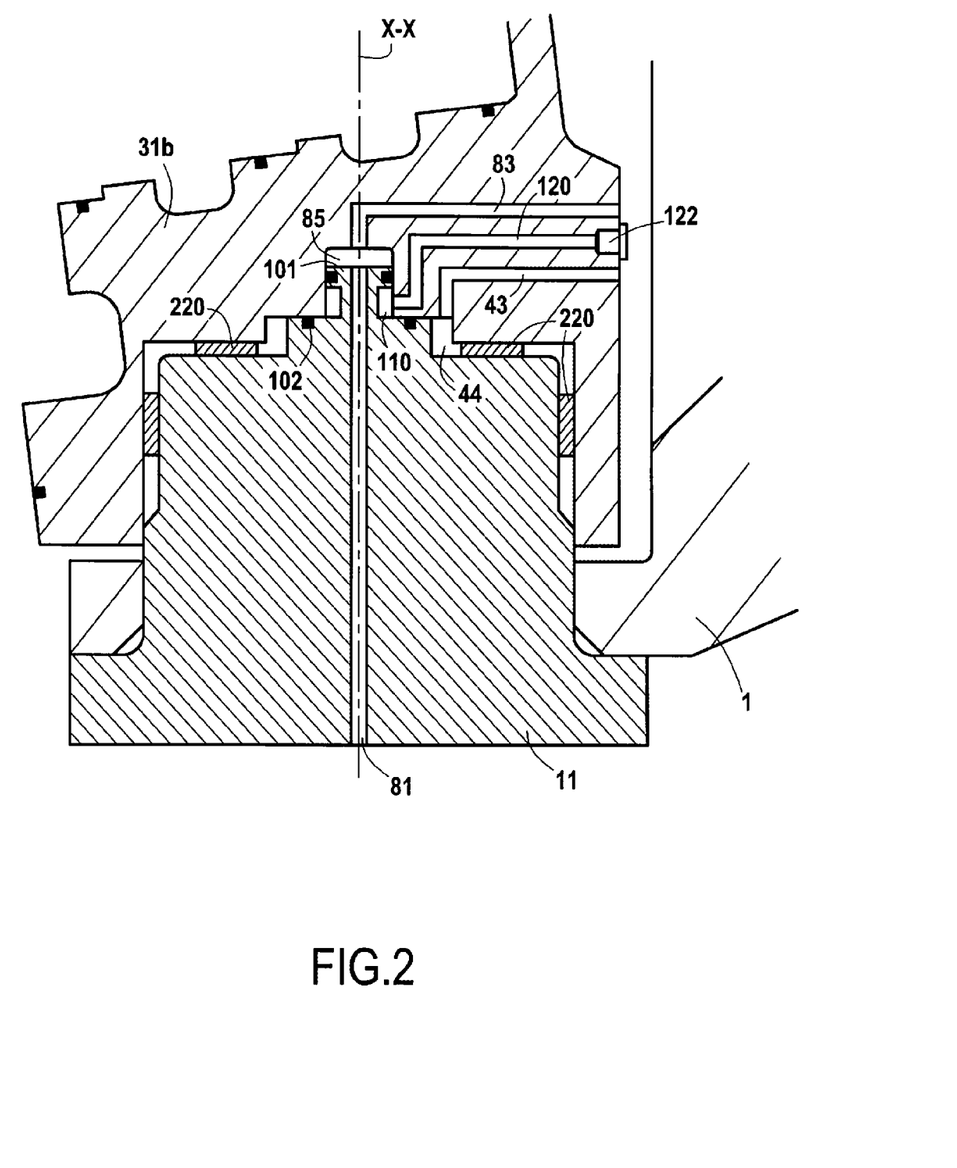
FIG. 2 is a detailed view of an area of FIG. 2.
Figure 3:
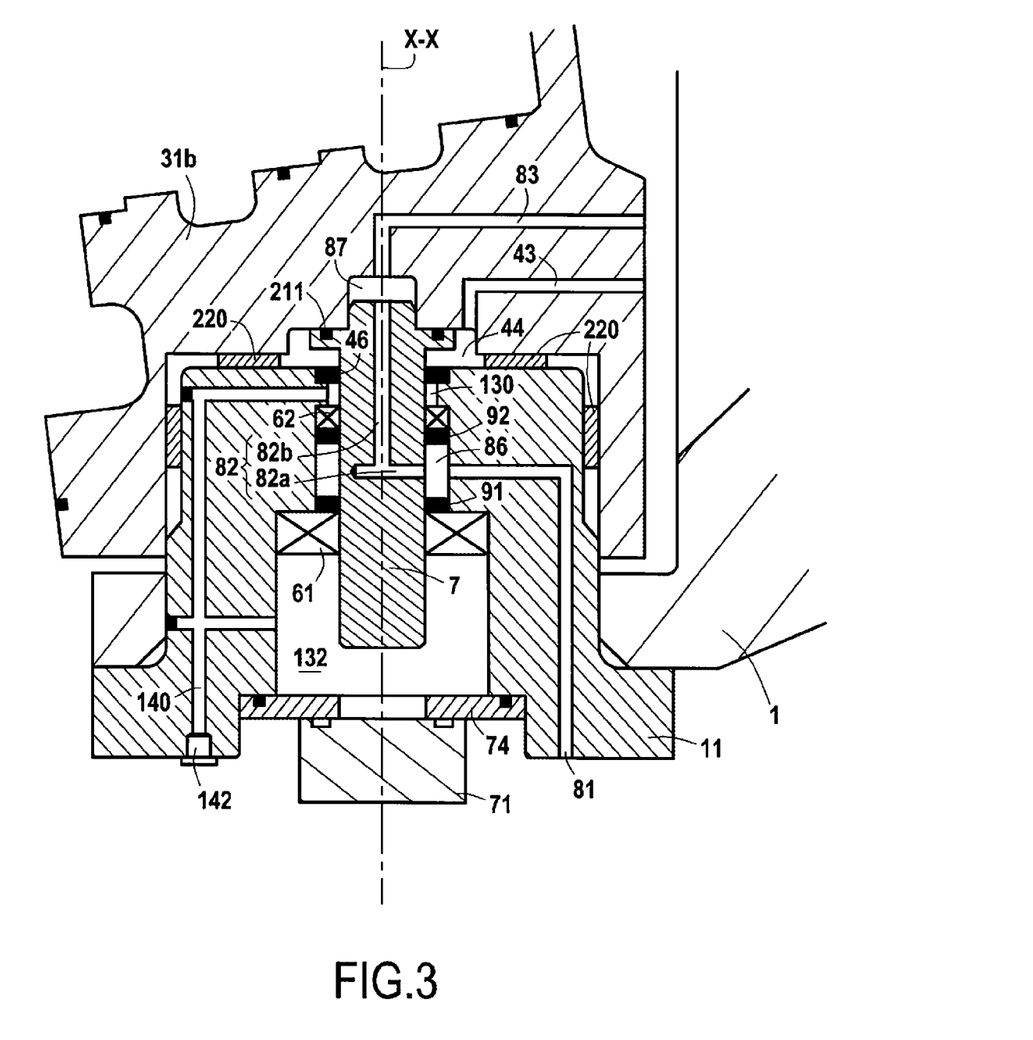
FIG. 3 is a detailed view similar to FIG. 2 representing one variant.

FIG. 3 is a variant of the embodiment represented in FIG. 2, in which the pivot is equipped with an intermediate rotation part 7, this intermediate part 7 can be used as element for setting up a steering sensor, for example contactless steering sensor.

The intermediate part 7 is fixedly mounted relative to the distribution casing 31b. It is isolated from the surrounding environment via a cover 74 fixedly mounted relative to the pivot element 11 (and therefore relative to the axle 1). The cover 74 is here formed in two portions, and here is associated with a plug 71, which may for example comprise a contactless rotation sensor.

In the represented example, the intermediate part 7 is press-fitted via one end in a housing of the distribution casing 31b, the sealing of this connection being ensured by a gasket seal 211 positioned in a groove formed in the intermediate part 7.

Sealing elements 91 and 92 are interposed between the pivot element 11 and the intermediate part 7, typically lip ring-type gasket seals. According to one embodiment, it is also possible to interpose rolling elements or friction pads between the pivot element 11 and the intermediate part 7. In the represented example, two rolling elements 61 and 62 are interposed between the pivot element 11 and the intermediate part 7. These rolling elements 61 and 62 may be framed by the sealing elements 91 and 92, or conversely frame these sealing elements 91 and 92, which is the case of the embodiment represented in FIG. 3.

As an alternative not represented in the figures, no rolling and/or friction element is interposed between the pivot element 11 and the intermediate part 7.

It is thus understood that the structure of the conduit for the passage of air via the pivot must be modified relative to the embodiment of FIG. 2 due to the presence of the intermediate rotation part 7.

In this embodiment, two air chambers are thus formed; a first air chamber 86 between the pivot element 11 and the intermediate part 7, and a second air chamber 87 between and the intermediate part 7 and the distribution casing 31b. The first air chamber 86 is isolated by the sealing elements 91 and 92. It is connected to an axle conduit 81 which has an end opening from the pivot element 11 typically adapted to be connected to a pressurized air supply source.

An intermediate conduit 82 is also formed in the intermediate part 7, this intermediate conduit 82 connecting the first air chamber 86 to the second air chamber 87. In the represented example, this intermediate conduit 82 comprises a radial segment 82a extending radially relative to the axis X-X, and an axial segment 82b extending along the axis X-X.

A distribution conduit 83 is here also formed in the distribution casing 31b, and then extends from the second air chamber 87 and is configured to be connected to a pneumatic duct secured to the hydraulic apparatus 3.

As for the previous embodiment, the distribution conduit 83 may be opening at its other end (and is then adapted to be associated with hydraulic connector elements), or be connected to a conduit or to an air chamber arranged in the hydraulic apparatus 3. The distribution conduit 83 can thus be connected to an air chamber directly via the casting of the casing of the hydraulic apparatus 3, to allow the supply of a tire associated with the hydraulic apparatus 3 with pressurized air.

The combination of the axle conduit 81, of the first air chamber 86, of the intermediate conduit 82, of the second air chamber 87 and of the distribution conduit 83 thus makes it possible to achieve a pneumatic circulation between the axle 1 and the hydraulic apparatus 3 directly via the pivot 2.

As for the embodiment represented above, the rotation between the pivot element 11 and the distribution casing 31b is ensured via friction pads 220. These friction pads 220 are positioned in a grease chamber 44 supplied by a grease conduit 43 here formed in the distribution casing 31b, and configured to be connected to a grease supply source. The grease conduit 43 could alternatively be made in the pivot element 11, the function being then unchanged. A grease seal 46 is positioned between the pivot element 11 and the intermediate part 7, in order to isolate the grease chamber 44. In the represented example, the grease seal 46 is mounted in abutment against an internal radial shoulder of the pivot element 11. The grease seal 46 in particular allows isolating the grease chamber 44 relative to the sealing element 92 and to the first air chamber 86.

Such successive mounting of sealing elements causes the formation of intermediate volumes 130 between two successive sealing elements, in particular between the grease seal 46 and the sealing element 92. Such an intermediate volume 130 can be used to collect any leakage from the first air chamber 86 and/or from the grease chamber 44, and to discharge such leakage toward the surrounding environment.

Thus, in the represented example, a leakage conduit 140 connects the intermediate volume 130 to the surrounding environment via a rated check valve 142. Similarly, an intermediate volume 132 formed between the sealing element 91 and the cover 74 is connected to the surrounding environment via a rated check valve. In the represented example, the intermediate volumes 130 and 132 are both connected to the surrounding environment via a rated check valve 142 mounted on a conduit opening in these two volumes. The rated check valve 142 is configured to allow air to escape from the intermediate volumes 130 and 132 toward the surrounding environment when the pressure within the intermediate volumes 130 and 132 exceeds a threshold value, thereby making it possible to achieve a release of the excess pressure in these intermediate volumes 130 and 132 in case of leakage. Alternatively, each of these intermediate volumes may be connected to the surrounding environment via a leakage conduit and a specific rated check valve. The rated check valve 142 is typically configured to open at a pressure difference of less than 1 bar, preferably less than 0.5 bar.

Figure 4:
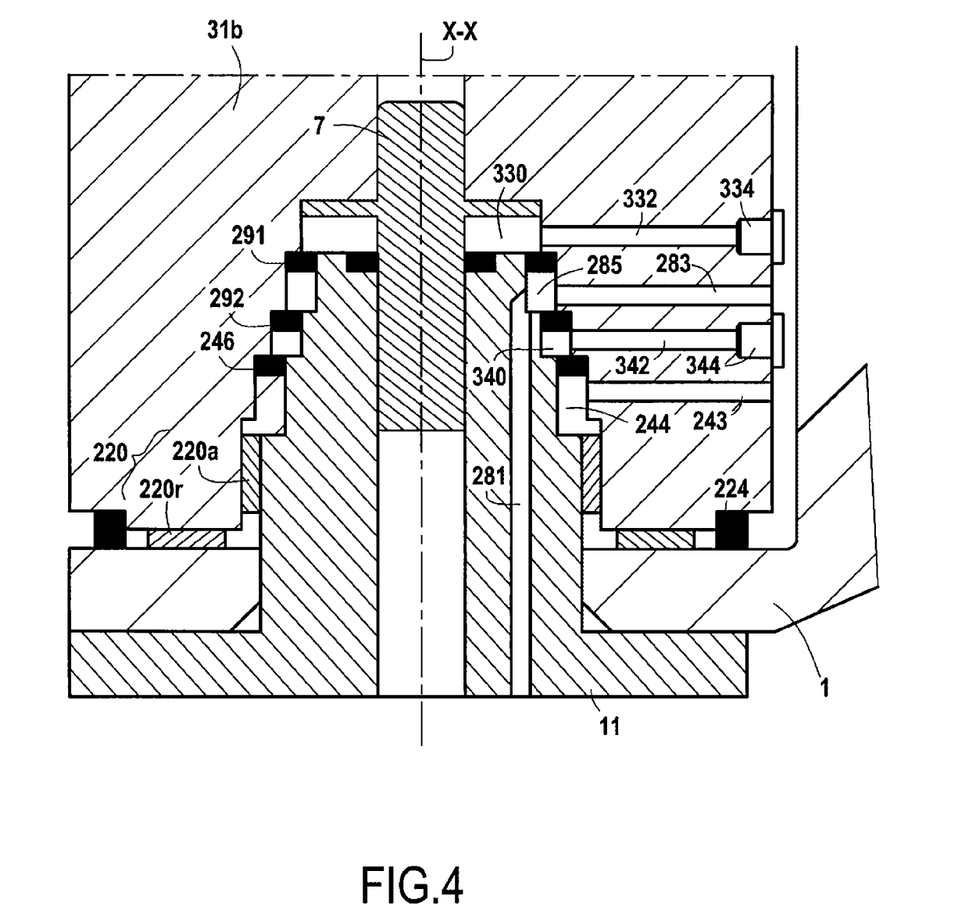
FIG. 4 is a detailed view similar to FIG. 2 representing another variant.

FIG. 4 represents one variant of the embodiment described above with reference to FIG. 3.

In this variant, the intermediate part 7 is housed between the pivot element 11 and the distribution casing 31b; none of the elements protrudes from the pivot element 11.

The positioning of the friction pads 220 is also modified. In this example, an axial friction pad 220a is thus identified between the pivot element 11 and the distribution casing 31b, and a radial friction pad 220r between the axle 1 and the distribution casing 31b. These friction pads 220 are disposed in a grease chamber 244 isolated from the surrounding environment by a sealing element 224 and delimited on the other hand by a grease seal 246. A grease conduit 243 here formed in the distribution casing 31b (but being alternatively able to be formed in the pivot element 11) ensures a feed of grease into the grease chamber 244.

An air chamber 285 is formed between the pivot element 11 and the distribution casing 31b. Contrary to the embodiment represented in FIG. 2 in which the air chamber is formed in the central portion of the pivot 2, it is here made peripherally, so as not to require a passage through the intermediate part 7.

This air chamber 285 is delimited by two sealing elements 291 and 292 interposed between the pivot element 11 and the distribution casing 31b. An axle conduit 281 is made in the pivot element 11 (or directly in the axle 1 in the case of an embodiment not comprising the pivot element 11), and connects the external environment to an air chamber 285 formed between the pivot element 11 and the distribution casing 31b.

A distribution conduit 283 formed in the distribution casing 31b then extends from this air chamber 285 and is configured to be connected to a pneumatic conduit secured to the hydraulic apparatus.

It is thus understood that this embodiment makes it possible to propose a pivot 2 equipped with an intermediate part 7, while retaining a simple structure for the production of the pneumatic duct within the pivot 2.

In the same manner as in the previous embodiments, means for purging volumes adjacent to the air chamber 285 are advantageously provided. Thus, a first volume 330 separated from the air chamber 285 by the sealing element 291 is connected to the surrounding environment via a release conduit 332 here formed in the distribution casing 31b (but being alternatively able to be formed in the pivot element 11) equipped with a rated check valve 334. A second volume 340 formed between the sealing element 292 and the grease seal 246 is also connected to the surrounding environment via a release conduit 342 here formed in the distribution casing 31b (but being alternatively able to be formed in the pivot element 11) equipped with a rated check valve 344. As for the previous embodiments, the rated check valves allow achieving a release of the pressure within these volumes when the pressure exceeds a threshold value.

In the represented embodiment, the volumes 330 and 340 are each associated with a separate release conduit. Alternatively, these two volumes can be connected to the ambient medium via a single conduit opening into the two volumes, and equipped with a single rated check valve.

The invention makes it possible to carry out the tire inflation by using only fixed ducts (no need for a flexible pipe). Indeed a fixed duct can connect a compressor and the axle conduit 81, because there is no relative movement between these two parts. A fixed duct may also connect the duct 83 with a tire inflation system.

Although the present invention has been described with reference to specific exemplary embodiments, it is obvious that modifications and changes can be made to these examples without departing from the general scope of the invention as defined by the claims. Particularly, individual characteristics of the various illustrated/mentioned embodiments can be combined in additional embodiments. Therefore, the description and drawings should be considered in an illustrative rather than restrictive sense.

It is also obvious that all the characteristics described with reference to one method can be transposed, alone or in combination, to one device, and vice versa, all the characteristics described with reference to one device can be transposed, alone or in combination, to one method.

The invention claimed is:

1. An assembly comprising a hydraulic apparatus which comprises a rotor and a stator, the rotor being rotatably mounted relative to the stator along a second axis of rotation, and being secured to a spindle for mounting of a vehicle wheel,
pivot element configured for mounting on an axle, and movable in rotation relative to the hydraulic apparatus along a first axis of rotation, the stator being rotatably mounted relative to the axle along the first axis of rotation,
wherein an air chamber is formed between the pivot element and the hydraulic apparatus, said air chamber being connected to a distribution conduit arranged in the hydraulic apparatus, and to an axle conduit arranged in the pivot element, so as to form a pneumatic conduit between the pivot element and the hydraulic apparatus, in order to allow air to be conveyed for the inflation/deflation of a tire.

2. The assembly according to claim 1, further comprising at least one friction pad positioned in contact with the hydraulic apparatus and with the pivot element configured to allow a rotational movement about the first axis of rotation between the pivot element and the hydraulic apparatus.

3. The assembly according to claim 2, wherein said at least one friction pad is positioned in a grease chamber isolated from the air chamber by means of a grease seal, said grease chamber being connected to a grease conduit arranged in the pivot element or in the hydraulic apparatus.

4. The assembly according to claim 3, wherein the grease chamber is separated from the air chamber by at least one sealing element.

5. The assembly according to claim 4, wherein the grease chamber is separated from the air chamber by two successively mounted sealing elements, defining therebetween an intermediate chamber, connected to the surrounding environment by a conduit comprising a rated check valve.

6. The assembly according to claim 5, wherein the rated check valve is configured to open for a pressure difference of less than 1 bar, or more precisely less than 0.5 bar.

7. The assembly according to claim 1, further comprising an intermediate part positioned in a housing formed between the hydraulic apparatus and the pivot element.

8. The assembly according to claim 7, wherein a first air chamber is formed between the pivot element and the intermediate part, a second air chamber is formed between the intermediate part and the hydraulic apparatus, the first air chamber is connected to the axle conduit, the second air chamber is connected to the distribution conduit, and the first air chamber is connected to the second air chamber via an intermediate conduit formed in the intermediate part.

9. The assembly according to claim 1, wherein each air chamber is delimited by sealing elements.

10. The assembly according to claim 1, wherein the pivot element and/or the hydraulic apparatus comprise at least one conduit connecting volumes adjacent to the air chambers to the surrounding environment, each of said at least one conduit being equipped with a rated check valve configured to allow the fluid to escape toward the surrounding environment when the pressure within said volumes adjacent to the air chambers exceeds a threshold value.

* * * * *